United States Patent
Shibuya et al.

(10) Patent No.: US 7,054,055 B2
(45) Date of Patent: May 30, 2006

(54) ACOUSTO OPTIC ELEMENT (75) Inventors: Kimihiko Shibuya, Mino (JP); Toshimi Nishiyama, Hirakata (JP); Yoshiaki Ishimura, Yawata (JP); Hiroyuki Takeuchi, Eniwa (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/873,333

(22) Filed: Jun. 22, 2004

(65) Prior Publication Data

US 2004/0257636 A1 Dec. 23, 2004

(30) Foreign Application Priority Data

Jun. 23, 2003 (JP) .............................. 2003-177967

(51) Int. Cl.
*G02F 1/33* (2006.01)
(52) U.S. Cl. ...................... 359/305; 359/311; 359/285; 359/323
(58) Field of Classification Search ................ 359/311, 359/237, 312, 310, 313, 314, 305, 285, 322, 359/323; 600/437, 447; 367/7
See application file for complete search history.

(56) References Cited

U.S. PATENT DOCUMENTS

| | | | |
|---|---|---|---|
| 3,729,250 A | 4/1973 | Kusters et al. | |
| 5,790,720 A | 8/1998 | Marcuse et al. | |
| 5,929,893 A | 7/1999 | Son et al. | |
| 6,449,083 B1 * | 9/2002 | Nishiyama | 359/285 |
| 6,674,564 B1 * | 1/2004 | Vernackt et al. | 359/311 |
| 2002/0191264 A1 | 12/2002 | Vernackt et al. | |

FOREIGN PATENT DOCUMENTS

| | | |
|---|---|---|
| EP | 0 749 032 A1 | 12/1996 |
| EP | 1 076 256 A1 | 2/2001 |
| JP | 2-6919 A | 1/1990 |
| JP | 3-144418 A | 6/1991 |
| JP | 3-160413 A | 7/1991 |
| JP | 6-347840 A | 12/1994 |

* cited by examiner

*Primary Examiner*—Hung Dang
*Assistant Examiner*—Tuyen Tra
(74) *Attorney, Agent, or Firm*—Rossi, Kimms & McDowell, LLP (57) ABSTRACT

An acousto optic element comprises optically transparent acousto optic medium having light incoming plane, light outgoing plane facing light incoming plane, transducer joining plane, and inclined plane tilted to transducer joining plane and piezoelectric transducer on which two opposing planes i.e., electrode layers and are formed and the transducer is connected to transducer joining plane of acousto optic medium through one of the electrode layers, wherein a deposited layer or a coating layer is formed on at least one of ultrasonic transducer or the acousto optic medium, the layer preventing ultrasonic waves generated by oscillation of ultrasonic transducer leaking onto acousto optic medium as a leakage-ultrasonic wave and propagating there, thus obtaining a high light-fading ratio.

11 Claims, 7 Drawing Sheets

ACOUSTO OPTIC ELEMENT

FIELD OF THE INVENTION

This invention relates to an acousto optic element to be used for an optical instrument outputting an image and a character with a laser beam.

BACKGROUND OF THE INVENTION

A structure of a conventional acousto optic element is disclosed in Japanese Laid Open Application No: H6-247840 for instance. Following, the disclosed example is explained using FIG. 11 and FIG. 12.

FIG. 11 is a perspective view of a conventional acousto optic element, and FIG. 12 is a perspective view of the acousto optic element cut out along a center line of a piezoelectric transducer in a longitudinal direction, explaining a working principle of the acousto optic element.

Figure 11:
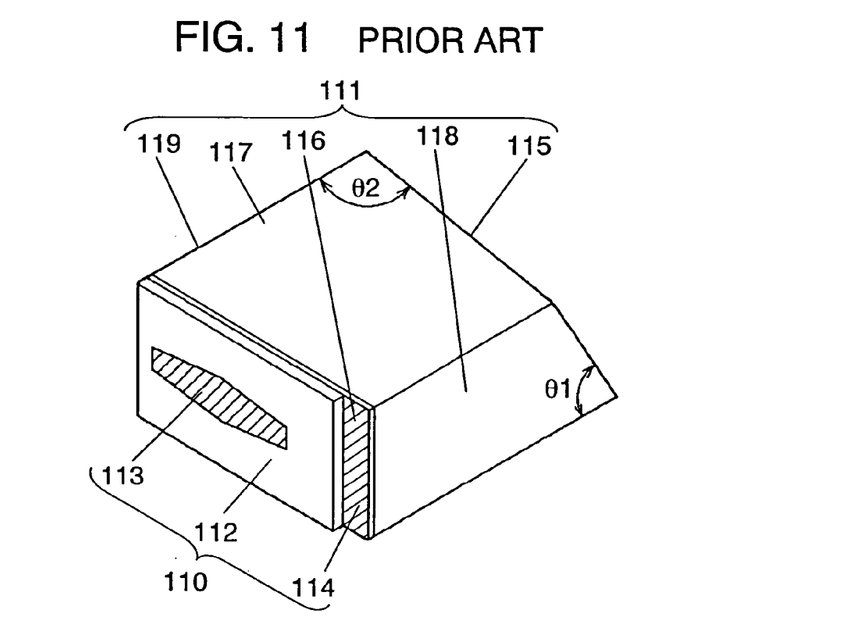
FIG. 11 is a perspective view of a conventional acousto optic element.

The acousto optic element is composed of piezoelectric transducer 110 having a piezoelectric characteristic, and jointed to acousto optic medium 111 at transducer joining plane 116 as shown in FIG. 11. Front side electrode layer 113 and back side electrode layer 114 are formed on each surface of piezoelectric material 112 for applying an electric signal to piezoelectric transducer 110. Acousto optic medium 111 is made in a shape where inclined plane 115 is two-dimensionally tilted as will be described next, and facing toward transducer joining plane 116 to which piezoelectric transducer 110 is attached. In other words, inclined plane 115 is tilted to plane (angle determining plane) 117 of acousto optic medium 111 by an angle θ2 slanted toward a ridge as a reference line to which angle determining plane 117 and light outgoing plane 119 come into contact, as well as tilted to light incoming plane 118 a side plane of acousto optic medium 111 by an angle θ1 slanted toward a ridge as a reference line to which light incoming line 118 and a plane facing angle determining plane 117 come into contact. With this angle of inclination, interference between the ultrasonic wave propagating in acousto optic medium 111 and refracted by inclined plane 115 and the ultrasonic wave newly generated by piezoelectric transducer 110 is controlled.

Figure 12:
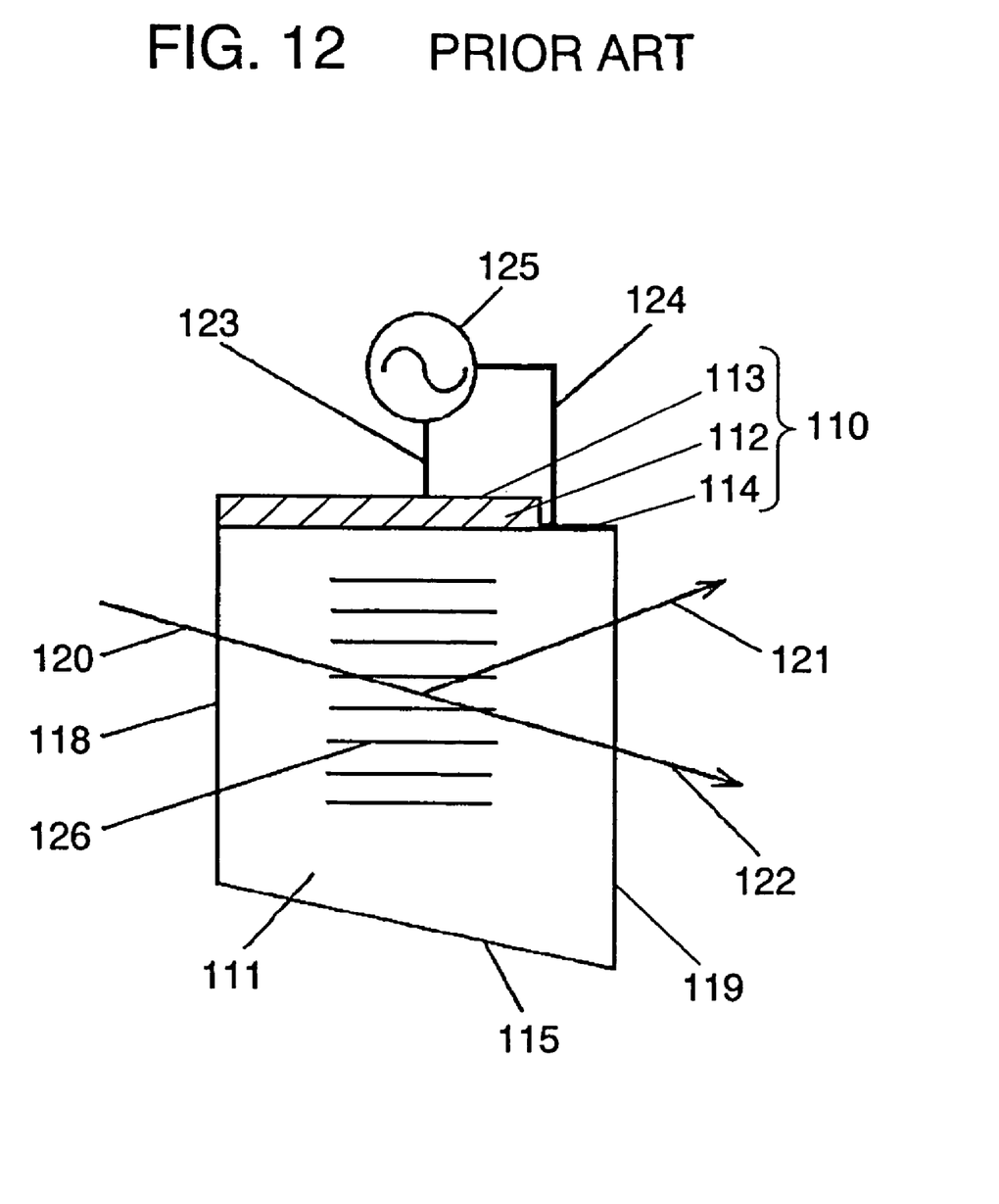
FIG. 12 is a cross-sectional view of the conventional acousto optic element shown in FIG. 11, cut along a center line of a piezoelectric transducer in a longitudinal direction thereof, and is for explaining a working principle of the element.

The working principle of the above mentioned acousto optic element will be explained using FIG. 12. An electric signal emitted by high frequency output source 125 is applied though lead wires 123 and 124 to front side electrode layer 113 and backside electrode layer 114 formed on both sides of surface of piezoelectric material 112, exciting piezoelectric transducer 110. The excited piezoelectric wave is emitted as ultrasonic wave flux 126 to acousto optic medium 111. A thin and thick state is thereby caused inside acousto optic medium 111 in a frequency of ultrasonic wave flux 126, having acousto optic medium 111 works as a diffraction grating. Hence, when incoming light 120 is input to light incoming plane 118 in an appropriate direction, diffracted light 121 is output. However, when the electric signal from high frequency power source 125 is turned off, ultrasonic waves flux 126 from piezoelectric transducer 110 disappears, making the optical media ineffective as the diffraction granting. Diffracted light 121 fades away but through-light beam 122 is output from acousto optic medium 111. Thus, since diffracted light 121 and through-light beam 122 are given out of the optical media when high frequency power source 125 is turned on and off, it becomes possible to modulate the incoming light to the outgoing light.

However, in the conventional acousto optic element, diffracted light 121 is still observed immediately after the electric signal from high frequency power source 125 is turned off. The reason is as follows. Piezoelectric transducer 110 excited by an electric signal generates an ultrasonic wave in a surface leakage mode, propagating on a surface of acousto optic medium 111. And, even after the electric signal is turned off extinguishing ultrasonic wave flux 126, the ultrasonic wave in the surface leakage mode comes back to piezoelectric transducer 110 without fading, exciting piezoelectric transducer 110. Thus, the excitation causes and transmits an unnecessary ultrasonic wave to acousto optic medium 111, diffracting an incoming light.

Putting an intensity of diffracted light generated by an applied electric signal P1, and an intensity of diffracted light caused by an unnecessary ultrasonic wave when the electric signal is turned off P2, a fading ratio of light is expressed by a following formula.

Fading ratio of light=10·log($P2/P1$)

The fading ratio of light is an important parameter representing performance of an acousto optic element in controlling on/off of a diffracted light and controlling strength of modulation of the diffracted light.

Dropping of the fading ratio of light by the unnecessary ultrasonic wave causing degradation of a picture quality has become a large task of an acousto optic element for optical instrument which is required to draw an image and a letter precisely.

This invention was made in considering above problems, and aiming to provide an acousto optic element having a high light-fading ratio which makes an influence of unnecessary ultrasonic wave small, diffracts an incoming light securely according to a control electric signal, and controls an intensity of the diffracted light.

SUMMARY OF THE INVENTION

The acousto optic element of the invention comprises:

an optically transparent acousto optic medium having a light incoming plane, a light outgoing plane facing toward the light incoming plane, a transducer joining plane, and a inclined plane slantly facing a transducer joining plane; and a piezoelectric transducer having electrode layers formed on two opposing sides of a piezoelectric material and bonded to the transducer joining plane with one of the electrode layers, wherein, a processed layer or a coating layer is formed on at least one of a piezoelectric transducer and an acousto optic medium, preventing ultrasonic waves generated by oscillation of the piezoelectric transducer leaking out onto the acousto optic medium as a leakage-ultrasonic wave and propagating there.

With this constitution, generation of unnecessary diffracted light caused by the leakage-ultrasonic wave is avoided, and intensity of the diffracted light is precisely controlled, enabling an acousto optic element to have a high light-fading ratio.

DETAILED DESCRIPTION OF THE EXEMPLARY EMBODIMENT

Following, the exemplary embodiments of this invention will be explained using the drawings. Because a same numerical mark is given to a common constituent member, detailed explanation is sometimes omitted.

First Exemplary Embodiment

Figure 1:
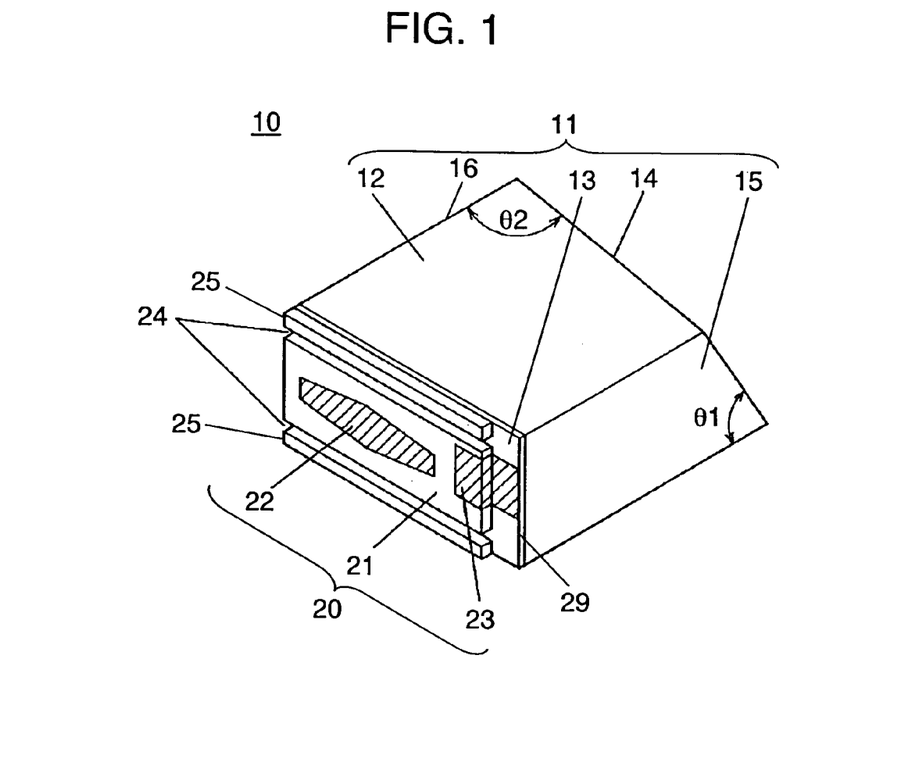
FIG. 1 is a perspective view of an acousto optic element in accordance with first embodiment of the present invention.

FIG. 1 is a perspective view of an acousto optic element 10 in accordance with the first exemplary embodiment of the present invention. Acousto optic element 10 in the exemplary embodiment is composed of acousto optic medium 11 and piezoelectric transducer 20 having a piezoelectric characteristic, and is attached to transducer joining plane 13 of acousto optic medium 11.

Acousto optic medium 11 is an optically transparent material in three-dimensional shape, constituted by transducer joining plane 13 connecting the piezoelectric transducer to the acousto optic medium, inclined plane 14 slantly facing transducer joining plane 13, light incoming plane 15, light outgoing plane 16 facing light incoming plane 15, and two planes surrounded by said planes. One of the two surrounding planes is angle-determining plane 12 determining an angle of inclination of inclined plane 14.

Inclined plane 14 is two-dimensionally tilted, as is described below, namely inclined plane 14 is tilted to angle determining plane 12 of acousto optic medium 11 by an angle of θ2 toward a ridge reference line to which angle determining plane 12 and light outgoing plane 16 come into contact with each other. The plane is also tilted to light incoming plane 15 of acousto optic medium 11 by an angle of θ2 toward a ridge reference line to which light incoming plane 15 and the plane facing the angle determining plane come into contact. Having the tilted angles, the acousto optic element prevents interference between ultrasonic wave propagated in acousto optic medium 11 and refracted by inclined plane 14 and an ultrasonic wave newly produced by piezoelectric transducer 20.

Electrode layers are formed on both planes of piezoelectric material 21 of piezoelectric transducer 20. To distinguish them, they are called surface electrode layer 22 and backside electrode layer 23. A transducer side electrode formed on backside of piezoelectric transducer 20 and an optical media side electrode formed on acousto optic medium 11 are connected onto integrated layer 28, constituting joining layer 29. Backside electrode layer 23 is formed extending toward a surface of piezoelectric material 21 through an exposed portion of joining layer 29 which is the back side electrode of piezoelectric material 21, so that lead wires are bonded easy.

Piezoelectric transducer 20 has two grooves 24 formed substantially in parallel with angle determining plane 12 and the plane facing the angle determining plane. Grooves 24 in this exemplary embodiment are formed into transducer joining plane 13 through joining layer 29. As a result, piezoelectric materials 25 in a bar shape are formed at both sides of piezoelectric transducer 20 being separated from the transducer electrically as well as physically.

By having groove 24, the subject element obtains following effects. Generation of a leakage-ultrasonic wave caused by excitation of piezoelectric transducer 20 and propagation of it on a surface of acousto optic medium 11 can be prevented with it; and even if the leakage wave is partially propagated, its feedback to piezoelectric transducer 20 is prevented. Therewith, the element having enough degree of light fading ratio is provided.

In this invention, the shape of the groove 24 is not restricted to the one mentioned above. The groove can be made into only halfway thickness of material 21 of piezoelectric transducer 20 for instance.

In the exemplary embodiment, acousto optic medium 11 is composed of a single-crystal tellurium-dioxide ($TeO_2$) because of its wide light-wave transmission characteristic and a high exponential acousto optic performance. Piezoelectric transducer 20 is a plate made of piezoelectric material 21 composed of 36° Y cut lithium-niobate ($LiNbO_3$), and front side electrode layer 22 and back side electrode layer 23 are formed are deposited on it. Piezoelectric transducer 20 is connected to acousto optic medium 11 with transducer joining plane 13, a plane of (001) surface orientation of the single crystal tellurium dioxide. It is desirable that front side electrode layer 22 and the extended portion of back side electrode layer 23 to be formed after piezoelectric transducer 20 is connected to acousto optic medium 11.

Being excited by an electric control signal applied from outside, piezoelectric transducer 20 oscillates and induces an ultrasonic wave causing a longitudinal oscillation in acousto optic medium 11. The induced wave is radiated into acousto optic medium 11 as a flux of ultrasonic waves and causes a thin and thick wave state in acousto optic medium 11 in a frequency of flux of ultrasonic wavelength, effecting acousto optic medium 11 as a diffraction granting. Thus, when an incoming light is input to light incoming plane 15 in an appropriate angle, a diffracted light is caused. When the electric signal is cut off, the flux of the ultrasonic wave from piezoelectric transducer 20 disappears, putting the diffraction granting ineffective. As a result, the diffracted light disappears and a through-light beam is given out of acousto optic medium 11. As the diffracted light or the through-light beam is given out by turning on-off of the electric signal, modulation of the incoming light for the outgoing light becomes possible.

Figure 2:
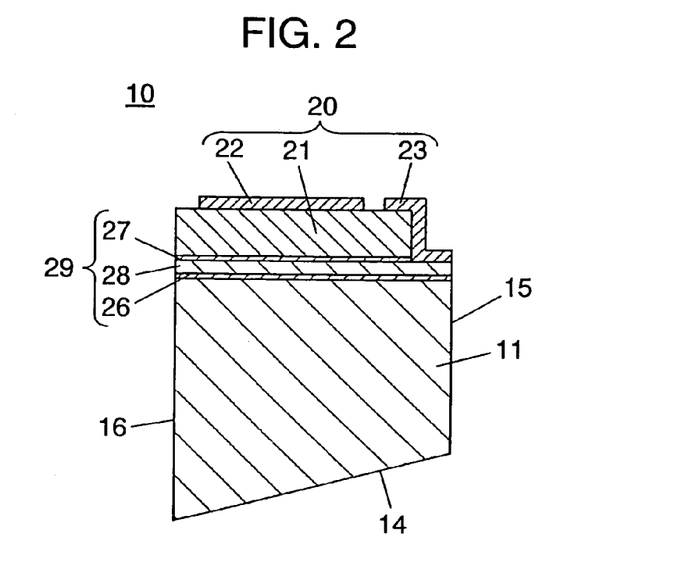
FIG. 2 is a cross-sectional view of the acousto optic element cut along a center line of a piezoelectric transducer in a longitudinal direction thereof.

A manufacturing method of the acousto optic element 10 in the exemplary embodiment of the present invention will be described in detail below using FIGS. 2 and 3. FIG. 2 is a cross-sectional view of acousto optic element 10 shown in FIG. 1 taken along a center line of piezoelectric transducer 20 in a longitudinal direction.

With acousto optic element 10 in exemplary embodiment of the present invention, acousto optic medium 11 and piezoelectric transducer 20 are connected by the following process. First, depositing contact layer 26 made of nichrome (Ni—Cr) alloy in a thickness of approximately 100 nm on transducer joining plane 13 of acousto optic medium 11, and then depositing a first joining layer made of tin (Sn) in a thickness of approximately 500 nm on contact layer 26 by a vacuum deposition method for instance, forming an optical media side electrode layer. Next, depositing contact layer 27 made of nichrome (Ni—Cr) alloy in a thickness of approximately 100 nm on one of the planes of piezoelectric transducer 20, followed by depositing a second joining layer made of tin (Sn) in a thickness of approximately 500 nm on contact layer 27 also by the vacuum deposition method for instance, forming a transducer side electrode layer.

Thus, after forming the tin (Sn) layers on each contact layers, joining the first joining layer and the second joining layer, heat-pressing the tin (Sn) and integrating metallurgically into integrating layer 28. Tin (Sn) on both layers are integrated, and contact layers 26 and 27 and integrated layer 28 constitute joining layer 29. Thus, joining layer 29 connects piezoelectric transducer 20 and acousto optic medium 11 together. Joining layer 29 also serves as the backside electrode layer of piezoelectric transducer 20. Then, forming backside electrode 23 covering exposed portion of joining layer 29 extending up to a surface of piezoelectric material 21.

By metallurgically integrating the tin layers, impedance between acousto optic medium 11 and piezoelectric transducer 20 is matched, and the ultrasonic wave excited by piezoelectric transducer 20 is effectively transmitted to acousto optic medium 11 and propagated there.

Next, making adjustment on thickness of piezoelectric transducer 20 so that the transducer may resonate at a frequency of a control signal, generating an ultrasonic wave and transmitting the wave effectively. When a control signal having a carrier of 200 MHz is used, the thickness of piezoelectric transducer 20 is adjusted to 18 μm, for instance. In order to attain to a required thickness, polishing piezoelectric transducer 20 after the transducer is connected to acousto optic medium 11, then measuring its frequency response. Repeating the cycles until the required thickness is attained. After making the adjustment of the thickness for resonating at a desired frequency, depositing front side electrode layer 22 and backside electrode layer 23 onto the surface of piezoelectric transducer 20 by the vacuum deposition method for instance. The electrical control signal is applied to front side electrode layer 22 and backside electrode layer 23.

In manufacturing acousto optic elements 10 in this exemplary embodiment shown in FIG. 1 and FIG. 2, multiples of acousto optic elements are processed simultaneously on the optical block which will be cut into optical medium later, before front side electrode layer 22 and backside electrode layer 23 are formed on the element.

Figure 3:
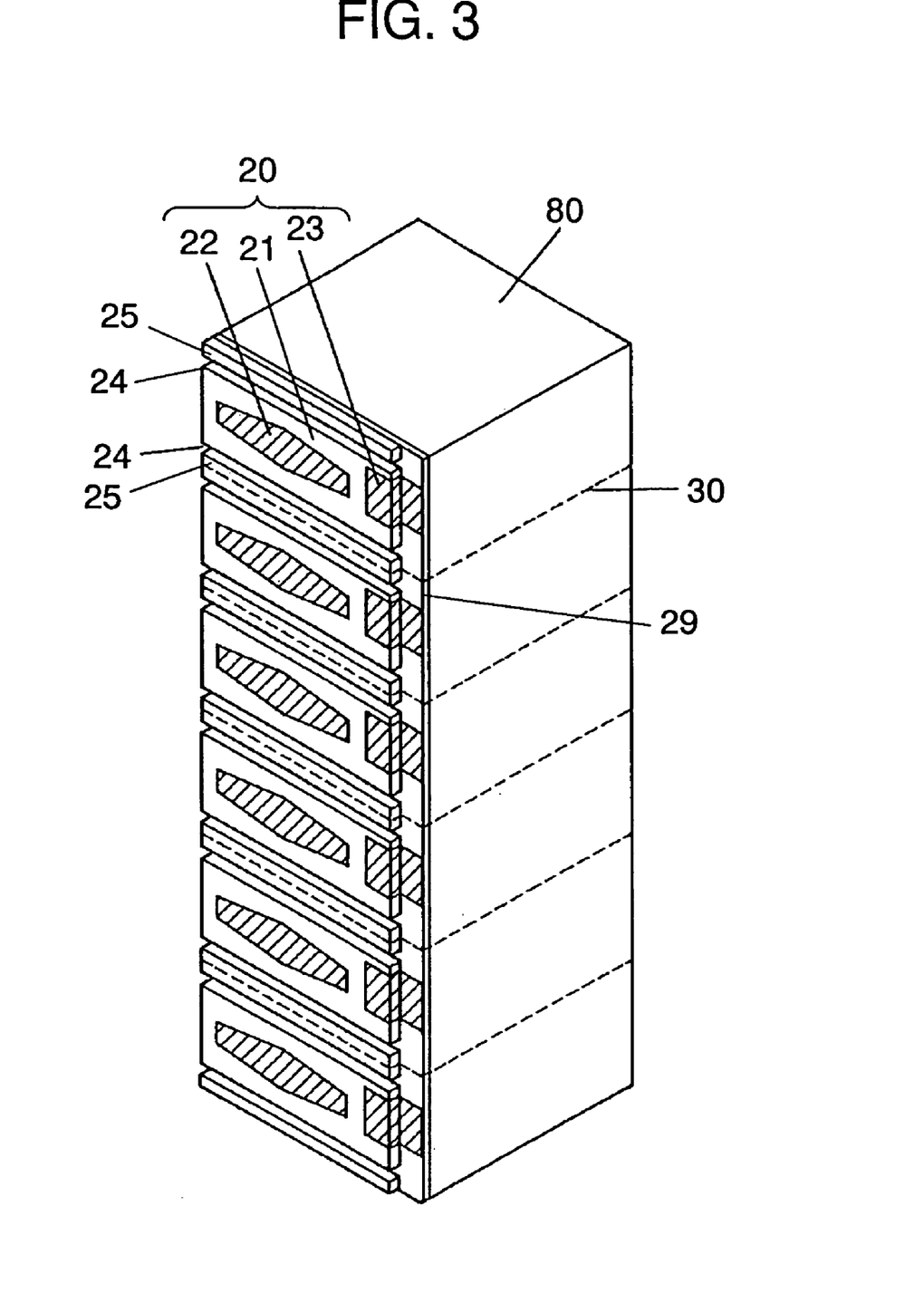
FIG. 3 is a perspective view of an optical block before dicing into acousto optic elements in the manufacturing process of the acousto optic element.

FIG. 3 is a perspective view of an optical block 80 processed up to a stage before diced into individual acousto optic element 11. Piezoelectric material 21 having the transducer side electrode layer thereon is connected to a plane which is the transducer joining plane of optical block 80 by the method mentioned, then piezoelectric material 21 is polished until it reaches to a prescribed thickness, and then front side electrode layer 22 and backside electrode layer 23 are formed. Manufacturing process up to this point has been explained with FIG. 2.

Next, forming groove 24 on piezoelectric material 21 of piezoelectric transducer 20, in parallel with a longitudinal direction of front side electrode layer 22 as illustrated in FIG. 3, using a dicing machine. In this exemplary embodiment, groove 24 is approximately 10 μm wide and its depth includes a part of optical block 80. With grooves 24, electrically separated piezoelectric materials 25 in a bar shape are formed on both sides of the piezoelectric material. Position of groove 24 is not restricted unless it comes below angle-determining plane 12, or unless it touches front side electrode layer 22. Width of the groove is not restricted to 10 μm but it can be wider.

In this exemplary embodiment, the groove is formed down to a depth including a part of optical block 80, but the invention is not limited to this depth. The grooves can be formed down to halfway of the piezoelectric material or to joining layer 29. Two grooves are formed at both sides of the piezoelectric material, but forming one groove at a side of angle determining plane 12 is allowed.

After forming groove 24, cutting optical block 80 along cut lines 30 shown in FIG. 3, for producing individual pieces of acousto optic element 10. The block is cut a wire-saw, which multiple pieces are cut one time.

Then after the individual piece is made, polishing a plane of the piece facing piezoelectric transducer 20 by an angle of θ1 and θ2, forming inclined plane 14 having a two-dimensional inclination. By inclining inclined plane 14 of acousto optic medium 11 two-dimensionally, interference between the ultrasonic wave propagated in acousto optic medium 11 and then refracted by inclined plane 14 and the ultrasonic wave newly produced by piezoelectric transducer 20 can be avoided.

Acousto optic element 10 in accordance with the exemplary embodiment of the present invention illustrated in FIG. 1 can be manufactured as has been demonstrated.

Next, performance of acousto optic element 10 manufactured by the method will be explained referring to evaluation results of the element. In evaluating the exemplary embodiment, a fading ratio of light was calculated and evaluated. First, P1 and P2 were measured; P1 being a strength of diffracted light caused when an electric signal was applied to piezoelectric transducer 20, and P2 being a strength of a diffracted light of leakage-ultrasonic wave caused when the electric signal was turned off and leaked and propagated on a surface of acousto optic medium 11. Then, fading ratio of light was calculated by a following formula:

$$\text{Fading ratio of light} = 10 \cdot \log(P2/P1)$$

Figure 4:
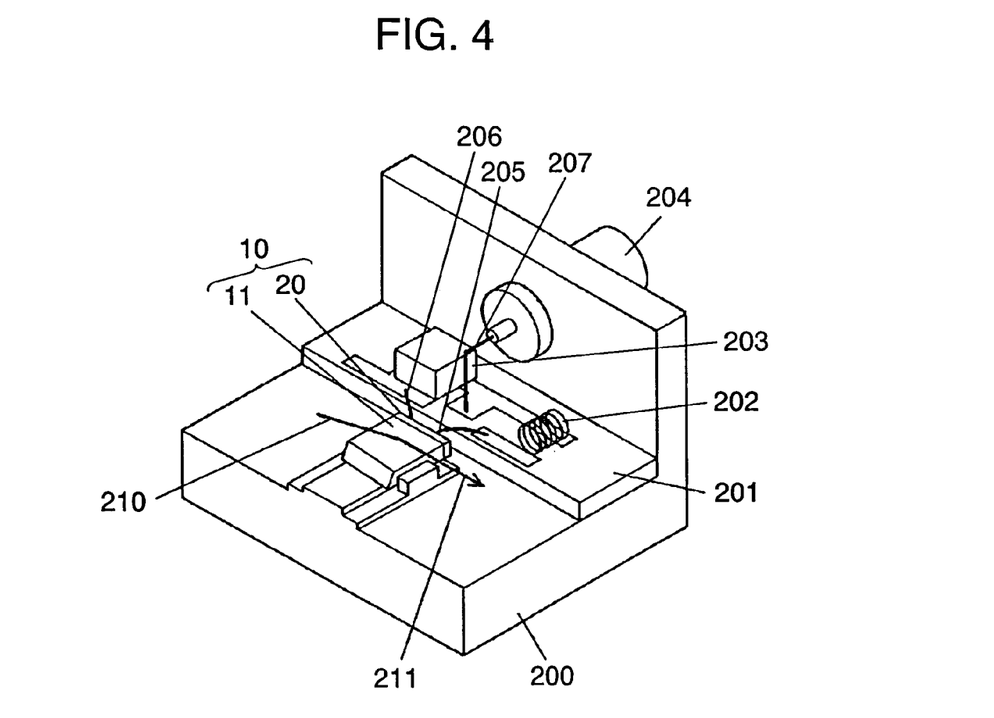
FIG. 4 is a perspective view of a measuring instrument measuring a light-fading ratio of the acousto optic element in accordance with the first exemplary embodiment.

The fading ratio of light was measured by an instrument illustrated in FIG. 4. The instrument in FIG. 4 comprises impedance matching circuit 201 composed of coil 202 an impedance matching element and trimmer capacitor 203 and high frequency power source 204, which are all mounted on frame 200. High frequency power source 204 is connected to impedance matching circuit 201 with lead wire 207.

Acousto optic element 10 is fixed to frame 200, and a front side electrode layer (not illustrated) and an extension of a backside electrode layer of piezoelectric transducer 20

(not illustrated) are connected to impedance matching circuit 201 with lead wires 205 and 206.

The instrument further includes a light source (not illustrated) for inputting incoming light 210 in a prescribed frequency and a light detector (not illustrated) for detecting a light intensity of diffracted light 211.

With the instrument in this constitution, applying an electric signal from high frequency power source 204 to piezoelectric transducer 20; then piezoelectric transducer 20 is excited radiating an ultrasonic wave. The ultrasonic wave is transmitted to acousto optic medium 11 as a flux of ultrasonic wave, creating a thick and thin state in acousto optic medium 11 in a frequency of the ultrasonic wave flux. Consequently, a diffraction granting is established in acousto optic medium 11. In this state, when incoming light 210 is input to the light incoming plane of acousto optic element 20 at a predetermined angle, diffracted light 211 is produced. When the electric signal of high frequency power source 204 is cut off, the ultrasonic wave by the flux of piezoelectric transducer 20 disappears. As a result, diffracted light 310 becomes essentially distinct and a through-light beam is output from light outgoing plane.

As a measuring condition of the instrument, a laser beam having a wave length of 488 nm and an output power of 5 mW was used as incoming light 210. By inputting incoming light 210 and turning high-frequency power source 204 on, P1 a power intensity of diffracted light 211 was measured. Then, in the state incoming light 210 is input, P2 a power intensity of diffracted light 211 was measured immediately after turning off high-frequency power source 204 therefore shutting off the electric signal applied to piezoelectric transducer 20. Then, a fading ratio of light was calculated from the power intensities P1 and P2.

A conventional acousto optic element not having groove 24 in piezoelectric transducer 20 was also prepared and it was measured in an identical procedure. The element is called a comparative element herein after.

Figure 5:
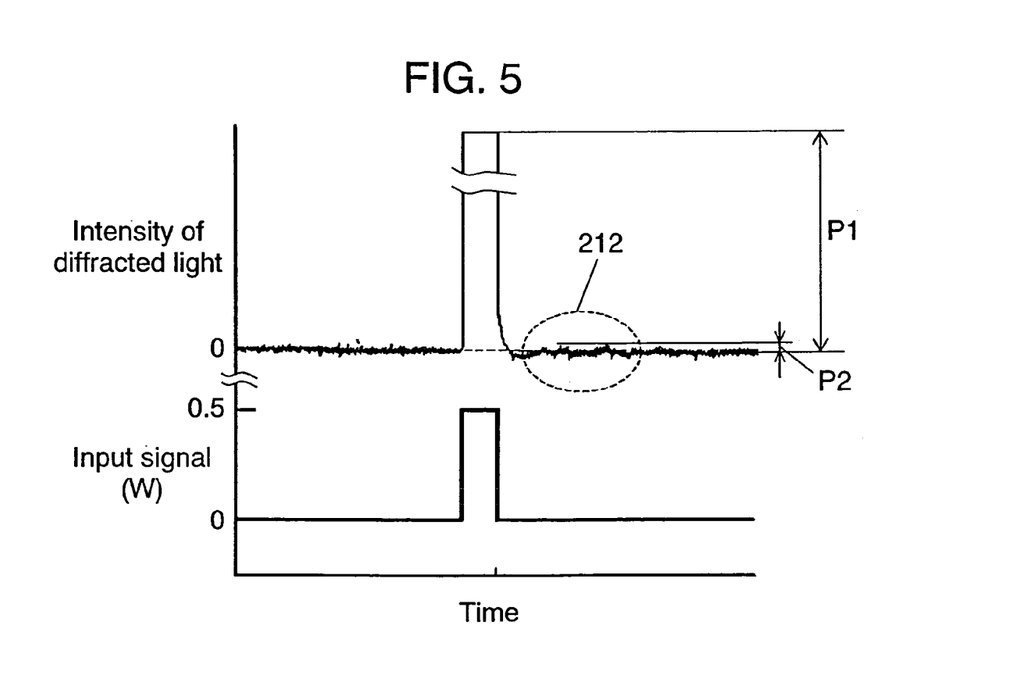
FIG. 5 is a graphical drawing showing measuring results of a light intensity of the acousto optic element in accordance with the exemplary embodiment.
Figure 6:
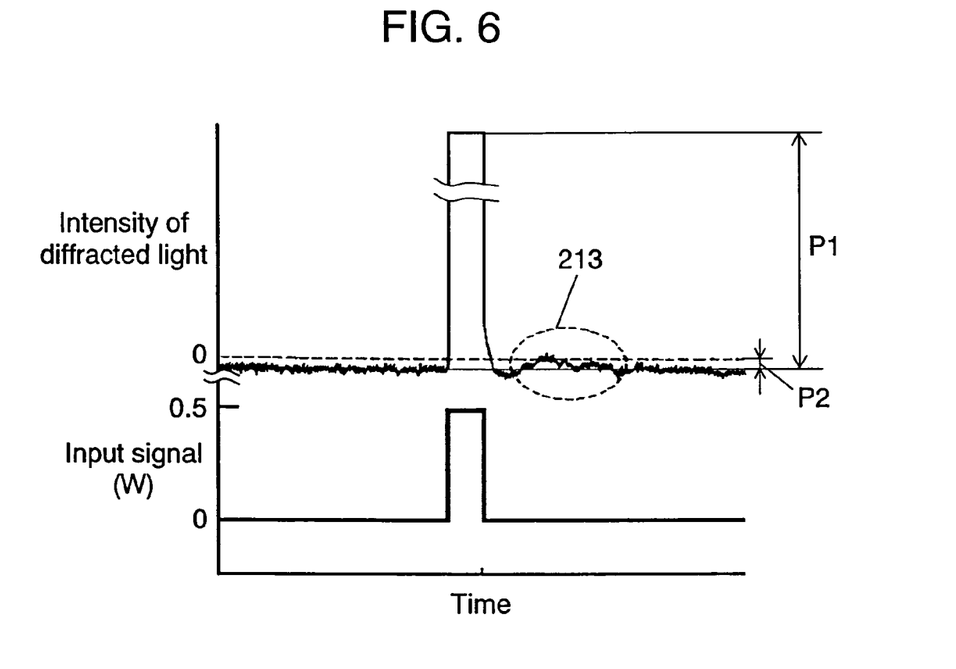
FIG. 6 is a graphical drawing showing measuring results of a light intensity of a comparative element of the element in accordance with the exemplary embodiment.

FIG. 5 shows measuring results of the intensity of light of acousto optic element 10 in the exemplary embodiment of the present invention, and FIG. 6 shows measuring results of the comparative element. As shown in FIGS. 5 and 6, intensity of diffracted light 211 immediately after shutting off the electric signal of high frequency power source 204 is higher in the comparative element (area 213 in FIG. 6) than in the acousto optic element 10 of the exemplary embodiment (area 212 in FIG. 5). Duration of diffracted light 211 is longer in the comparative element than in acousto optic element 10 in the exemplary embodiment. This is because the leakage ultrasonic wave in surface-leakage mode propagating on the surface of acousto optic medium 11 is fed back to piezoelectric transducer 20 exciting piezoelectric transducer 20, causing an unnecessary ultrasonic wave; and the unnecessary wave is sent out to acousto optic medium 11, diffracting incoming light 210 and causing diffracted light 211.

On the other hand, in acousto optic element 10 in the exemplary embodiment, groove 24 formed in piezoelectric transducer 20 prevents generation of leakage ultrasonic wave, and even when such wave is generated the groove prevents the wave from being fed back to piezoelectric transducer 20; thus, transmission of the unnecessary ultrasonic wave to acousto optic medium 11 is avoided.

The measuring results compared by the light fading ratio were as follows. With acousto optic element 10 in accordance with the exemplary embodiment of the present invention, P1 a light intensity of diffracted light 211 was 4.5 mW when an electric signal was applied to piezoelectric transducer 20, and P2 an intensity of the light of diffracted light 211 measured immediately after the electric signal was shut off was 4.0 µW, so that the fading ratio of light was −30.5 dB. On the other hand, with the comparative element, P1 an intensity of diffracted light 211 was 4.5 mW when an electric signal was applied to piezoelectric transducer 20, and P2 an intensity of diffracted light 211 immediately after the electric signal was shut off was 11.0 µW, and the fading ratio of light was −26.1 dB.

From these outcomes, it is noticed that the fading ratio of light of this acousto optic element 10 in the exemplary embodiment of the present embodiment is improved by 4.4 dB from the comparative element. The result shows that the ultrasonic wave in a surface leakage mode is smaller when acousto optic element 10 in the exemplary embodiment of the invention is used, securely diffracting the incoming light according to the on off control of the electric signal, thus enabling an acousto optic element to obtain a high fading ratio of light.

In the exemplary embodiment of the present invention, an acousto optic medium composed of single crystal tellurium dioxide was explained. However, material for the element in this invention is not restricted to this material. Material optically transparent, such as lead molybdate ($PbMoO_4$), synthetic quartz, and lithium niobate can be used, and the material does not have to be a single crystal material.

Nichrome (Ni—Cr) alloy is deposited on acousto optic medium 11 and piezoelectric material 21 as contact layers 26 and 27 serving as the optical media side electrode layer and the transducer side electrode layer, but the material is not restricted to the one employed in the invention, but chrome (Cr) or titanium (Ti) can be used in place of nichrome (Ni—Cr). In the exemplary embodiment, the first joining layer and the second joining layer are composed of tin (Sn), but solder material can replace it.

Second Exemplary Embodiment

Figure 7:
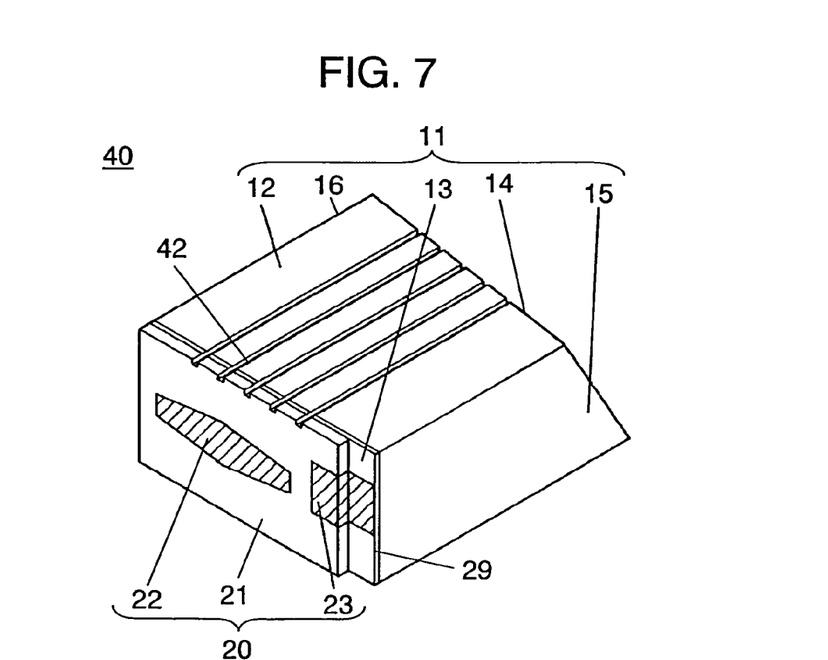
FIG. 7 is a perspective view of an acousto optic element in accordance with second exemplary embodiment of the present invention.

FIG. 7 is a perspective view of acousto optic element 40 in accordance with second exemplary embodiment of the present invention. Acousto optic element 40 in the exemplary embodiment is different from the first exemplary embodiment in forming position of groove 42. In acousto optic element 40 in this exemplary embodiment, groove 42 is formed on angle determining plane adjacent to transducer joining plane 13 in multiple numbers centering around an area of front side electrode layer 22 of piezoelectric transducer 20. Groove 42 is formed extended to a part of piezoelectric transducer 20.

Acousto optic element 40 in this exemplary embodiment is manufactured by a following method. First, bonding piezoelectric transducer 20 to a transducer joining plane of an optical block that will become individual pieces of acousto optic medium 11 later, by an identical method with the first exemplary embodiment. Next, polishing piezoelectric material of piezoelectric transducer 20 and adjusting its frequency. After adjusting to prescribed frequency, forming front side electrode layer 22 and backside electrode layer 23 on the block. Then, cutting the optical block along cut lines and getting individual pieces, by using the method identical with the first exemplary embodiment.

On an angle determining plane of an individual piece thus produced, forming a plurality of grooves 42 in approximately 10 µm wide and 5 µm deep at predetermined positions, using a dicing machine. Then, polishing a plane which will become an inclined plane of acousto optic medium 11 into an angle identical to that of the first exemplary embodiment, forming inclined plane 14, and finally getting acousto optic element 40 in accordance with the exemplary embodiment.

Intensity of light on acousto optic element 40 was measured in a case when an electric signal was applied to piezoelectric transducer 20 and another case when the signal was shut off, by an identical method to the first exemplary embodiment. Measuring instrument and evaluation method were identical to that of the first exemplary embodiment, so explanation is omitted.

On acousto optic element 40 in this exemplary embodiment, P1 an intensity of diffracted light when the electric signal was applied to piezoelectric transducer 20 was 4.5 mW, and P2 an intensity of diffracted light immediately after the electric signal was cut off was 5.5 µW. Hence, the fading ratio of light of the element was −29.1 dB. The result proves that the ratio is improved by 3 dB from a fading ratio of the comparative element in accordance with the first exemplary embodiment −26.1 dB.

Measurements result on intensity of light of diffracted light in time confirms that the intensity of the diffracted light is lost almost immediately in an identical manner as in FIG. 5.

Five grooves 40 are formed on angle determining plane 12 of acousto optic element 40 in this exemplary embodiment, but the number is not restricted in this invention as long as one groove is formed at least. Groove 42 is formed on transducer joining plane 13 including inclined plane 14 in the exemplary embodiment, but it can be formed on from light incoming plane 15 through to light outgoing plane 16. Moreover, width and depth of groove 42 are not restricted to 10 µm and 5 µm but they can be wider and deeper; for instance approximate 100 µm in width and 20 µm in depth are allowed.

Third Exemplary Embodiment

Figure 8:
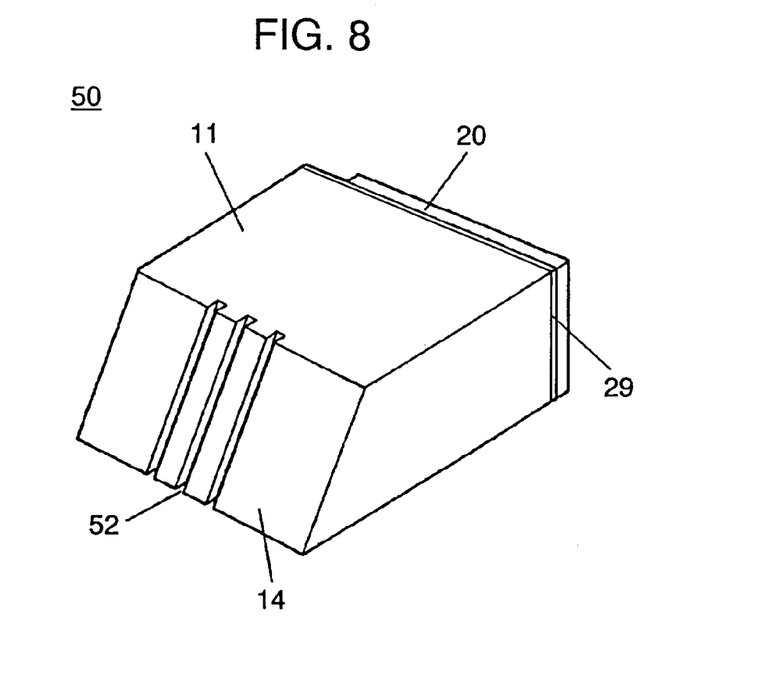
FIG. 8 is a perspective view of an acousto optic element in accordance with third exemplary embodiment of the present invention.

FIG. 8 is a perspective view of acousto optic element 50 in accordance with third exemplary embodiment of the invention. Acousto optic element 50 in this exemplary embodiment is different from the second exemplary embodiment in a forming position of groove 52. With acousto optic element 50 in this exemplary embodiment, a plurality of grooves are formed on inclined plane 14 of acousto optic medium 11, facing toward a formed area of surface side electrode layer 22 on piezoelectric transducer 20 and making the area its central part.

Acousto optic element 50 in this exemplary embodiment is manufactured by a following method. First, processing an optical block up to a point connecting front side electrode layer 22 and backside electrode layer 23 to the block, by an identical method with the second exemplary embodiment. Then, cutting the block with a dicing machine along a predetermined cut line and obtaining an individual piece. Next, polishing a plane that will become a inclined plane of acousto optic medium 11, making an angle identical to that of the second exemplary embodiment, and forming inclined plane 14. Then, forming a plurality of grooves 52 in 10 µm wide and 5 µm deep on inclined plane 14, obtaining acousto optic element 50 in the exemplary embodiment.

On acousto optic element 50, intensity of light was measured in a case where an electric signal was applied to piezoelectric transducer 20 and another case where the electric signal was cut off, by an identical method to the first exemplary embodiment. Measuring instrument and evaluation method were identical to that of the first exemplary embodiment and detailed explanation is left out.

With acousto optic element 50 in this exemplary embodiment, P1 an intensity of diffracted light was 4.5 mW when the electric signal was applied to piezoelectric transducer 20, and P2 an intensity of diffracted light immediately after the electric signal cut off was 7.8 µW, so that the fading ratio of light was −27.6 dB. The result indicates that the ratio was improved by 1.5 dB from −26.1 dB the light fading ratio of the comparative element in accordance with the first exemplary embodiment.

Measuring results of change of intensity of diffracted light in time confirms that the intensity of the diffracted light is lost almost instantly, as shown in FIG. 5 similarly.

A plurality of grooves 52 are formed on inclined plane 14 in this exemplary embodiment, but the invention is not limited to this number as long as at least one groove is formed. Groove 52 is formed in a central area of inclined plane 14 in the exemplary embodiment, but the groove can be formed in an entire area of inclined plane 14. Width and depth of groove 52 are not restricted 10 µm and 5 µm, but wider and deeper groove are allowed and approximately 100 µm in width and 20 µm in depth are allowed for instance.

Forth Exemplary Embodiment

Figure 9:
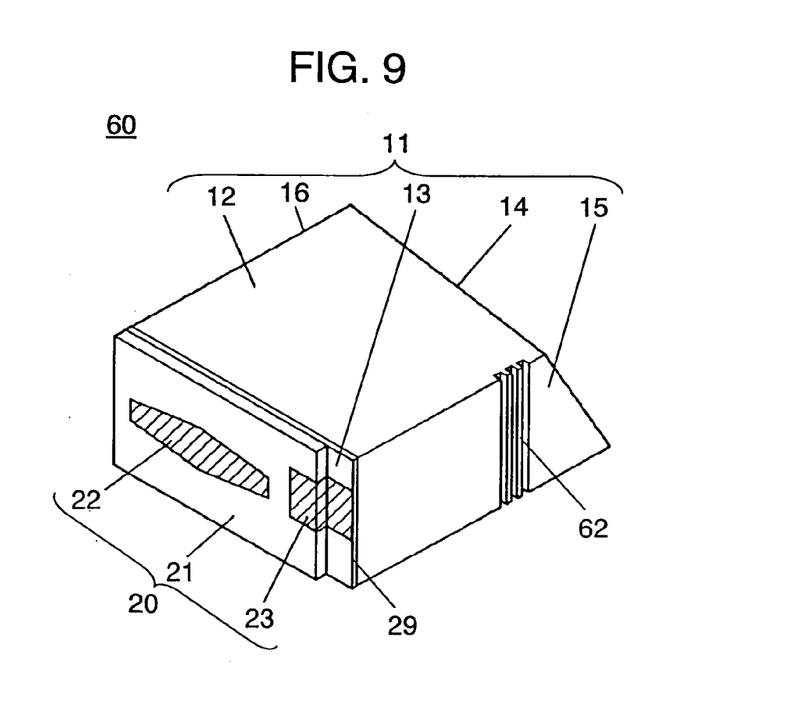
FIG. 9 is a perspective view of an acousto optic element in accordance with fourth exemplary embodiment of the present invention.

FIG. 9 is a perspective view of acousto optic element 60 in accordance with fourth exemplary embodiment of the present invention. Acousto optic element 60 is different from the second exemplary embodiment with regard to a location of groove 62. Groove 62 in the exemplary embodiment is formed on light incoming plane 15 of acousto optic medium 11 in an area not interrupting an incoming light.

Acousto optic element 60 in the exemplary embodiment is manufactured by a following method. First, processing an optical block which will become acousto optic medium 11 up to attaching front side electrode layer 22 and backside electrode layer 23 by an identical method to the second exemplary embodiment. Next, forming a plurality of grooves 62 of 10 µm wide and 5 µm deep on a plane which will become a light incoming plane of the optical block using a dicing machine, then cutting the block along a determined cut line obtaining an individual piece. Then, polishing the individual piece on a plane which will become inclined plane of acousto optic medium 11, forming inclined plane 14. In this way, acousto optic element 60 in accordance with the exemplary embodiment is obtained.

In case of acousto optic element 60 in the exemplary embodiment, groove 62 can be formed while the optical block is produced, namely the grooves can be formed on a plurality of acousto optic elements simultaneously, improving productivity of the element.

Intensity of light was measured on acousto optic element 60 in the exemplary embodiment, in a case an electric signal was applied to piezoelectric transducer 20 and in another case the electric signal was turned off, by an identical method to the first exemplary embodiment. Measuring instrument and evaluation method was identical to that of the first exemplary embodiment and detailed explanation is omitted.

With acousto optic element 60 in the exemplary embodiment, P1 an intensity of diffracted light was 4.5 mW when the electric signal was applied to piezoelectric transducer 20, and P2 an intensity of diffracted light was 7.5 µW immediately after the electric signal was turned off. Therefore, fading ratio of light was −27.8 dB. The result indicates that the value is improved by 1.7 dB from −26.1 dB of the comparative element in accordance with the first exemplary embodiment. Measuring results also confirms that change in the intensity of diffracted light in time goes off almost instantly, as similarly indicated by FIG. 5.

In acousto optic element 60 in the exemplary embodiment, three grooves 62 are formed on light incoming plane 15. The invention does not restrict the number in the invention, as long as it has at least one groove formed. In the exemplary embodiment, groove 62 is formed on light incoming plane 15 in a side coming into contact with inclined plane 14, but the groove can be formed in a side coming into contact with transducer joining plane 13 as well. Width and depth of the groove are not restricted to the 10 μm and 5 μm, but they can be wider and deeper, and a groove in approximately 100 μm in width and 20 μm in depth is allowed. In this exemplary embodiment, groove 62 is formed after the optical block has been produced, but the groove can be formed after the block is cut into individual pieces; in this case, the groove having a certain angle to a longitudinal direction of light incoming plane 15 can be formed as well as in the longitudinal direction.

Fifth Exemplary Embodiment

Figure 10:
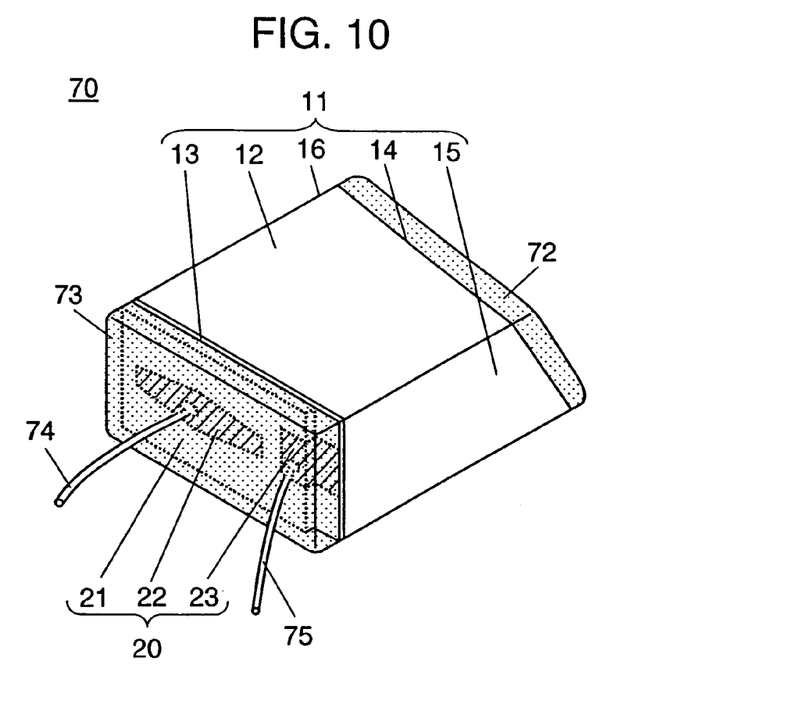
FIG. 10 is a perspective view of an acousto optic element in accordance with fifth exemplary embodiment of the present invention.

FIG. 10 is a perspective view of acousto optic element 70 in accordance with fifth exemplary embodiment of the present invention. In producing acousto optic element 70 in the exemplary embodiment, attaching piezoelectric transducer 20 to acousto optic medium 11, and then depositing resin layers 72 and 73 having a damper characteristic for ultrasonic-wave on an inclined plane of acousto optic medium 11 and on piezoelectric transducer 20. Resin layers 72 and 73 prevent an ultrasonic wave leaking and propagating on surface of acousto optic medium 11. As material of the layer, silicone resin as well as silicone compound such as silicone-denatured epoxy resin hardened in a room temperature can be used for instance. Rubber material and rubber material mixed with silicone resin, and other resin material can also be used as long as it absorbs the ultrasonic wave.

Acousto optic element 70 in the exemplary embodiment is manufactured by a following method. Namely, acousto optic element 70 in the exemplary embodiment can be produced by an identical method of producing acousto optic element 40 in the second exemplary embodiment, except for a process of forming groove 24. In case of producing acousto optic element 70 in the exemplary embodiment, resin layers 72 and 73 having a damper characteristic are formed on inclined plane 14 and piezoelectric transducer 20 instead of forming the groove.

In the exemplary embodiment, resin layers 72 and 73 are formed after lead wires 74 and 75 are attached to front side electrode layer 22 and to backside electrode layer 23 of piezoelectric transducer 20. As material composing layers 72 and 73, the silicone-denatured epoxy resin hardened in a room temperature is used. Resin layers 72 and 73 have the damper characteristic against the leaking and propagating ultrasonic wave. Forming resin layers 72 and 73, acousto optic element 70 in the exemplary embodiment is obtained.

On acousto optic element 70 in the exemplary embodiment, intensity of light was measured by applying an electric signal to piezoelectric transducer 20 and by shutting off the signal, according to an identical method to the first exemplary embodiment. Measuring instrument and evaluation procedure were identical to those of the first exemplary embodiment so explanation of them is omitted.

In acousto optic element 60 in the exemplary embodiment, P1 an intensity of diffracted light was 4.5 μW when the electric signal was applied to piezoelectric transducer 20, and P2 an intensity of diffracted light immediately after the electric signal was turned off was 6.9 μW, therefore fading ratio of light was −28.1 dB. It is proved that the ratio is 2.0 dB improve from −26.1 dB of the comparative element in the first exemplary embodiment.

Measuring results on change of the diffracted light in time confirms that the intensity of the diffracted light disappears essentially at once, as is similarly illustrated in FIG. 5.

In this exemplary embodiment, resin layers having the damper characteristic against ultrasonic wave are formed on piezoelectric transducer 20 and on inclined plane 14 facing the transducer. However, the invention is not restricted to this structure; and the resin layer can be formed on only one of surfaces of piezoelectric transducer 20 and inclined plane 14.

In the exemplary embodiments in the second through the fourth, groove is formed only on one of planes of the acousto optic medium. But the invention is not restricted to this construction. The groove can be formed on a plurality of planes; for instance on two planes the angle determining plane and the light incoming plane. The groove can be formed on the light outgoing plane too, as well as on every exposed plane of the acousto optic medium.

In the fifth exemplary embodiment, the resin layer having the damper characteristic is formed on the piezoelectric transducer and the inclined plane. Notwithstanding, the resin layer having the damper characteristic can be formed on the piezoelectric transducer and the inclined plane in the first through fourth exemplary embodiments as well.

What is claimed is:

1. A single-channel acousto optic element comprising:
    an optically transparent acousto optic medium having a light incoming plane, a light outgoing plane facing the light incoming plane, a transducer joining plane, and an inclined plane tilted to the transducer joining plane; and
    a piezoelectric transducer having two electrode layers formed on two opposing planes thereof, with one of the electrode layers extending along both of the opposing planes, and the transducer being connected to the transducer joining plane of the acousto optic medium through the one electrode layer,
    wherein a groove is formed on at least one of the piezoelectric transducer or the acousto optic medium, the groove preventing ultrasonic waves generated by oscillation of the piezoelectric transducer leaking to a surface of the acousto optic medium as a leakage-ultrasonic wave.

2. The single-channel acousto optic medium according to claim 1,
    wherein the groove is at least one, formed on the piezoelectric material which constitutes the piezoelectric transducer.

3. The single-channel acousto optic element according to claim 2,
    wherein the groove formed on the piezoelectric material is formed into the acousto optic medium.

4. The single-channel acousto optic element according to claim 2,
    wherein one or more of the grooves are formed on both sides of one of the electrode layers.

5. The single-channel acousto optic element according to claim 3,
    wherein one or more of the grooves are formed on both sides of one of the electrode layers.

6. The single-channel acousto optic element according to claim 5,
wherein a plurality of grooves are formed on the inclined plane, centering around one of the electrode layers.

7. The single-channel acousto optic element according to claim 1,
wherein the groove is at least one, formed on at least one surface plane of the acousto optic medium.

8. The single-channel acousto optic element according to claim 7,
wherein a plurality of grooves are formed on at least one of the surface planes coming into contact with the transducer joining plane at right angles, centering around one of the electrode layers of the piezoelectric transducer.

9. The single-channel acousto optic element according to claim 8,
wherein the groove extends into part of the piezoelectric transducer.

10. A single-channel acousto optic element, comprising:
an optically transparent acousto optic medium having a light incoming plane, a light outgoing plane facing the light incoming plane, a transducer joining plane, and an inclined plane tilted to the transducer joining plane; and
a piezoelectric transducer having two electrode layers formed on two opposing planes thereof, with one of the electrode layers extending along both of the opposing planes, and the transducer being connected to the transducer joining plane of the acousto optic medium through the one electrode layer,
wherein a coating layer composed of a resin layer having a damper characteristic to an ultrasonic wave is coated on both surfaces of the piezoelectric transducer and the inclined plane of the acousto optic medium.

11. The single-channel acousto optic element according to claim 10,
wherein the resin layer is composed of silicone resin or resin containing silicone compound.

* * * * *